(12) United States Patent
Sasako et al.

(10) Patent No.: US 9,693,581 B2
(45) Date of Patent: Jul. 4, 2017

(54) METHOD FOR PRODUCING RICE FLOUR

(71) Applicant: NARA MACHINERY CO., LTD., Tokyo (JP)

(72) Inventors: Katsuhiko Sasako, Tokyo (JP); Hidetoshi Iwamatsu, Tokyo (JP); Ryuta Yamazaki, Tokyo (JP); Kwan-Hei Park, Seoul (KR)

(73) Assignee: NARA MACHINERY CO., LTD., Tokyo (JP)

( * ) Notice: Subject to any disclaimer, the term of this patent is extended or adjusted under 35 U.S.C. 154(b) by 503 days.

(21) Appl. No.: 14/364,757

(22) PCT Filed: Dec. 13, 2012

(86) PCT No.: PCT/JP2012/082984
§ 371 (c)(1),
(2) Date: Jun. 12, 2014

(87) PCT Pub. No.: WO2013/089273
PCT Pub. Date: Jun. 20, 2013

(65) Prior Publication Data
US 2014/0306036 A1 Oct. 16, 2014

(30) Foreign Application Priority Data

Dec. 14, 2011 (JP) .................................. 2011-273833

(51) Int. Cl.
*B02C 7/00* (2006.01)
*A23L 7/10* (2016.01)
(Continued)

(52) U.S. Cl.
CPC ............... *A23L 7/197* (2016.08); *A21D 2/36* (2013.01); *A21D 13/04* (2013.01); *A23L 7/198* (2016.08);
(Continued)

(58) Field of Classification Search
CPC .... B02C 7/13; B02C 7/14; B02C 7/06; B02B 1/08
(Continued)

(56) References Cited

U.S. PATENT DOCUMENTS 1,710,459 A * 4/1929 Romero .................... B02C 7/06
241/101.1
6,516,710 B1 * 2/2003 Knight .................... A23L 7/198
99/348

(Continued)

FOREIGN PATENT DOCUMENTS

JP 04-63555 A 2/1992
JP 07-100002 B2 11/1995
(Continued)

OTHER PUBLICATIONS

Yamazaki, R., "Beifun Seizo ni Okeru Kiki Sochi no Katsuyo Jirei", Kagaku Sochi, 2008, vol. 50, No. 9, pp. 67-71 (with partial English translation).
(Continued)

*Primary Examiner* — Faye Francis
(74) *Attorney, Agent, or Firm* — Posz Law Group, PLC

(57) ABSTRACT

A method is disclosed for producing, only with mechanical treatment, high-quality rice flour having a rounded particle shape, which is equivalent to fine flour obtained by using enzymes, has characteristics close to the characteristics of wheat flour, and is suitable for production of bread, cakes, noodles, and the like. In order to attain the object, a method for producing rice flour includes: providing primary crushing material rice subjected to soaking and adjustment of moisture content with a disintegrating and sizing device, fine grinding the primary crushed rice with an air mill, and then drying the fine ground rice with an air flow dryer.

5 Claims, 4 Drawing Sheets

(51) Int. Cl.
*A21D 2/36* (2006.01)
*A21D 13/04* (2017.01)
*B02B 1/08* (2006.01)
*B02C 7/06* (2006.01)
*B02C 7/13* (2006.01)
*B02C 7/14* (2006.01)

(52) U.S. Cl.
CPC ............... *B02B 1/08* (2013.01); *B02C 7/06* (2013.01); *B02C 7/13* (2013.01); *B02C 7/14* (2013.01)

(58) Field of Classification Search
USPC ........................................ 241/5, 23, 29, 6–13
See application file for complete search history.

(56) References Cited

U.S. PATENT DOCUMENTS

| | | | |
|---|---|---|---|
| 7,455,252 B2 | 11/2008 | Nara et al. | |
| 7,992,813 B2 | 8/2011 | Wakamatsu et al. | |
| 8,146,847 B2 | 4/2012 | Wakamatsu et al. | |
| 2006/0263499 A1* | 11/2006 | Satake | B02B 1/04 426/506 |

FOREIGN PATENT DOCUMENTS

| | | |
|---|---|---|
| JP | 3076552 B2 | 8/2000 |
| JP | 3154378 U | 9/2009 |
| JP | 2009-274019 A | 11/2009 |
| JP | 2010-284588 A | 12/2010 |
| WO | 2004/085069 A1 | 10/2004 |
| WO | 2007/069764 A1 | 6/2007 |
| WO | 2007-097475 A1 | 8/2007 |

OTHER PUBLICATIONS

Kanemoto, S., The development of recent processed rice and the rice flour milling technology, Food Processing and Ingredients, 2009, vol. 44, No. 6, pp. 11-14 (with partial English translation).

Chiba-ken Norin Suisan-bu Nogyo Kairyo-ka, Heisei 16 Nendo Senryaku Project Beifun Riyo Gijutsu Kakuritsu to Fukyu ni Kansuru Chosa Kenkyu Jigyo Jisshi Hokokusho, 2005, pp. 1-7 (with partial English translation).

International Search Report of the International Searching Authority mailed Feb. 26, 2013 for the corresponding international application No. PCT/JP2012/082984 (and English translation).

* cited by examiner

METHOD FOR PRODUCING RICE FLOUR

CROSS REFERENCE TO RELATED APPLICATIONS

This application is a U.S. national stage application of the International Patent Application No. PCT/JP2012/082984 filed on Dec. 13, 2012, and claims priority to, and incorporates by reference, Japanese Patent Application No. 2011-273833 filed on Dec. 14, 2011.

TECHNICAL FIELD

The present invention relates to a method for producing rice flour. More particularly, the present invention relates to a production method of high-quality rice flour suitable for producing bread, cakes, noodles, and the like.

BACKGROUND ART

Demands for grains are increasing because of a decrease in production due to draught and the like in wheat production regions caused by worldwide abnormal weather in recent years, embargos involved in the decrease in production, use thereof as biofuels, and the like. Consequently, price of sales to flour milling companies of imported wheat purchased by the government is continuously rising.

It is anticipated that food shortages on a global scale will be caused by the increase in the world population and prices of foods including wheat will further increase.

Therefore, the food shortages and the price rises are critical problems for Japan that has a low food self-sufficiency rate and depends on import for most of wheat.

On the other hand, in Japan, along with the change in dietary life, people further shift away from eating rice, rice consumption. And the consumption of cooked rice tends to decrease year after year.

Therefore, it is anticipated that a demand for rice flour as an alternative to wheat flour will further expand in future.

Rice flour has been produced by various methods from long ago. Specific methods for the production of rice flour include a stamp milling method (stone mill pestle milling method), a roll milling method, water grinding, and high-speed flour milling method (pin mill).

In particular, as a method for producing rice flour suitable for production of bread, cakes, noodles, and the like, for example, there is a method of producing rice flour using enzymes disclosed in Japanese Examined Patent Publication No. H7-100002 (hereinafter, Patent Document 1) or Japanese Patent No. 3076552 (hereinafter, Patent Document 2).

The method disclosed in Patent Document 1 is a method of, after immersing rice in a water solution in which pectinase (one of macerating enzymes) is dissolved, dehydrating and milling the rice, drying the rice to about moisture content of 15 weight % to prepare fine rice flour, heating the fine rice flour at temperature of about 150° C., and performing improvement of wettability and the like of the rice flour to enable use of the rice flour in a wheat flour use.

The method disclosed in Patent Document 2 is a method obtained by improving the method disclosed in Patent Document 1. This method is a method of selecting one or two or more kinds out of organic acid water solutions of sodium citrate, sodium lactate, sodium malate, sodium acetate, or the like mixed with pectinase to thereby create a treating solution and, after immersing rice in this treating solution, dehydrating, milling, and drying the rice.

Starch grain of the rice is compounded grains. A plurality of starch grains are included in amyloplast. The starch grains in rice grain albumen are tightly filled without a gap. A cell wall tissue wrapping the starch grain is firm. Therefore, in the case of a non-heated flour type, even if the rice is milled by the conventional method, only coarse flour can be produced. If the rice is ground by force, the starch grains are damaged. Both of processability and quality are markedly deteriorated.

Therefore, the methods disclosed in Patent Document 1 and Patent Document 2 provide a method of decomposing the cell wall tissue with the force of enzymes to thereby produce fine rice flour having round particles with a low starch damage rate.

However, although the method of producing rice flour using enzymes is an excellent method as explained above, the method has problems explained below.

That is, in the method of producing rice flour using enzymes, 0.05 to 0.1 weight % of enzymes are used with respect to 1 weight % of rice. A price of the enzymes is as high as 10,000 yen per 1 kg thus increases producing cost of rice flour.

For enzyme treatment, it is necessary not only to use a large quantity of water but also to provide a facility for treating wastewater after the use. Equipment cost and running cost for the facility are high and further increase producing cost of rice flour.

Furthermore, although the enzymes can be available in Japan, it is difficult to find such enzymes in overseas countries. Since the enzymes are living things, it is difficult to export the enzymes from Japan. Therefore, for example, in neighboring Korea or in South East Asian countries where a large quantity of rice is produced, rice flour cannot be produced using the enzymes.

Note that, as a method for producing rice flour, Japanese Examined Patent Publication H4-73979 discloses a technique for, after coarsely milling rice with a roll mill, milling the rice with an air mill to thereby obtain rice flour with less damage to starch grains. However, the rice flour obtained by the method has large surface roughness. That is, the surfaces of particles are angular. And, the angles crush fine air foam and the rice dough does not swell well. Therefore, as described in the section of "industrial applicability" of the publication, the rice flour obtained by the method is suitable for production of rice confectionery (rice crushers), dumplings, bean jam cakes, and the like. However, the rice flour is not suitable for production of bread, cakes, noodles, and the like.

DISCLOSURE OF THE INVENTION

The present invention has been devised in view of the problems of the above-mentioned background art and it is an object of the present invention to provide a method for making it possible to produce, only with mechanical treatment, high-quality rice flour, which is equivalent to fine flour obtained by using enzymes, is fine flour having a rounded particle shape, has characteristics close to the characteristics of wheat flour, and is suitable for production of bread, cakes, noodles, and the like.

In order to attain the object, the present invention provides a method for producing rice flour as described in [1] to [6] below.

[1] A method for producing rice flour characterized by following successive steps: soaking of material rice; adjusting of moisture content in the material rice; primary crushing of the material rice using a disintegrating and sizing device and finally drying the fine ground rice using an air flow dryer

[2] The method for producing rice flour described in [1], characterized in that the moisture content of the material rice is adjusted to 20 to 35 weight %.

[3] The method for producing rice flour described in [1] or [2], characterized in that the material rice is primary crushed to an average particle diameter of 0.5 to 2 mm by the disintegrating and sizing device.

[4] The method for producing rice flour described in any one of [1] to [3], characterized in that the primary crushed rice is fine ground to 200 mesh pass 60 to 90 weight % by the air mill.

[5] The method for producing rice flour described in any one of [1] to [4], characterized in that the fine ground rice is dried to a moisture content equal to or lower than 15 weight % by the air flow dryer.

[6] The method for producing rice flour described in any one of [1] to [5], characterized in that the disintegrating and sizing device is configured such that a rotating body and an opposite surface section opposed and separated from the rotating body by a predetermined gap are provided to form a gap region in a casing, the gap region is configured as a particle size adjustment region for allowing passage of particles matching the predetermined gap setting but disabling passage of particles not matching the predetermined gap setting, and the particles disabled to pass the gap region are brought into contact with, in an inlet section or a surface region section of the gap region, the opposite surface section in connection with turning of the rotating body, disintegrated to be capable of passing the gap region, and discharged from a discharge port.

With the method for producing rice flour according to the present invention described above, it is possible to produce, only with mechanical treatment, in other words, only with a physical method without using a biochemical method called enzyme treatment, high-quality rice flour, which is equivalent to fine flour obtained by using enzymes, is fine flour having a rounded particle shape, has characteristics close to the characteristics of wheat flour, and is suitable for production of bread, cakes, noodles, and the like.

The rice flour can be directly used as wheat alternative flour and can also be used by being mixed with wheat flour or a base of mix flour to be mixed with a sub-material such as gluten or fat and oil. A range of use of the rice flour is wide.

BEST MODE FOR CARRYING OUT THE INVENTION

Figure 1:
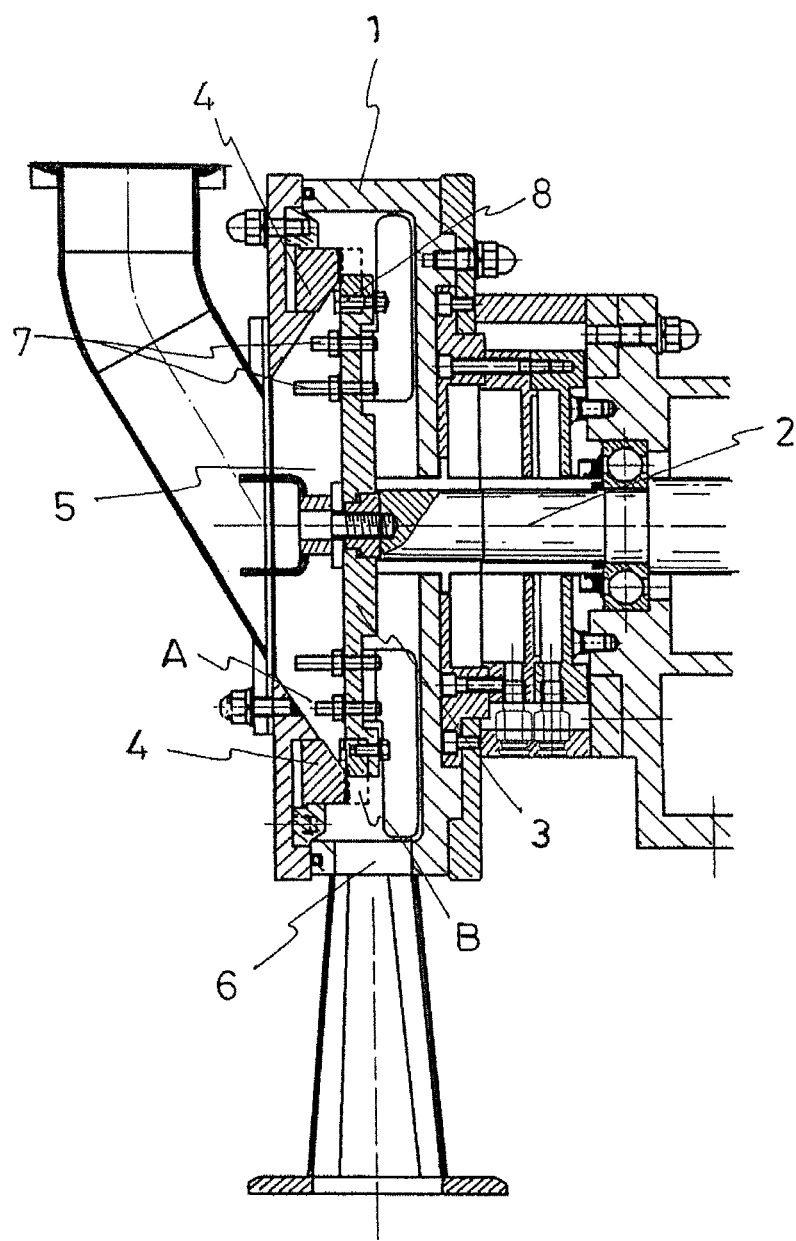
FIG. 1 is a longitudinal sectional view showing a disintegrating and sizing device that can be suitably used in a method for producing rice flour according to the present invention.

An embodiment of the method for producing rice flour according to the present invention explained above is explained below. However, the embodiment is simply for assisting understanding of the present invention. The present invention is not limited by the embodiment.

The method for producing rice flour according to the present invention is a production method for primary crushing, with a disintegrating and sizing device, material rice subjected to soaking and adjustment of moisture content, pulverizing the material rice with an air mill, and then drying the material rice with an air flow dryer.

The soaking and the adjustment of moisture content for obtaining the material rice is explained below as a [soaking step], the primary crushing of the material rice by the disintegrating and sizing device is explained as a [primary crushing step], the fine grinding of the material rice by the air mill is explained as a [fine grinding step], and the drying of the obtained fine ground material rice by the air flow dryer is explained as a [drying step] below.

[Soaking Step]

Rice is washed with water to remove oil content, bran, and microorganisms. Rice is immersed in hot water of 20 to 40° for 0.5 to 2 hours, preferably in hot water of 35 to 40° C. for 0.25 to 1 hour, and then drained (dehydrated) to have moisture content of 20 to 35 weight %, more preferably, 25 to 32 weight % to obtain material rice. The rice is immersed in the hot water having the predetermined temperature for the predetermined time first in order to make the rice soft and make it easy to disintegrate and mill the rice. Temperature of the hot water lower than the specified temperature and an immersion time shorter than the specified immersion time are not preferable because the rice cannot be brought into the state explained above. Conversely, temperature of the hot water exceeding the specified temperature and an immersion time exceeding the specified immersion time are not preferable because starch dissolves and becomes paste-like. Further, work efficiency is deteriorated. The moisture content of the rice after the immersion is set to the predetermined moisture content because of reasons explained below. If the moisture content of the rice is equal to or higher than 20 weight %, the rice is easily disintegrated and milled and a starch damage rate decreases. On the other hand, when the moisture content of the rice exceeds 35 weight %, the rice easily adheres to the apparatus in the next primary crushing step and the adhering rice is easily decomposed.

Note that the moisture content of the material rice is a value obtained by an infrared moisture meter. As a "rice washing method" in a broad sense serving as operation for removing oil content, microorganisms, and bran, besides the method of washing rice with water, there are a BG rice polishing method, an NTWP processing method, a dry rice polishing method, a chemical treatment method by chemical or the like, and the like.

The BG rice polishing method is a method of "removing bran with bran" and is a method of sticking and peeling bran by making use of adhesiveness of adhering bran called "skin bran" present on the surface of white rice.

The NTWP processing method is one of wet methods and is a method of, after softening the surface of white rice using water, mixing the rice with heated particulates such as pearl tapioca and agitating a mixture, sticking bran to the particulates, and removing the bran.

The dry rice polishing method is a method of removing bran using various apparatuses that remove bran on the surface of white rice only with special mechanical treatment without using water, a bran remover, or the like.

Note that it is not always necessary to perform the rice washing immediately before the soaking step. Rice treated by the various rice washing methods that is sold in the market as "no wash rice (it requires no washing of rice before cooking)" can be used.

[Primary Crushing Step]

The material rice prepared in the step explained above is primary crushed using the disintegrating and sizing device.

A target particle diameter of the primary crushing performed using the disintegrating and sizing device is preferably set to 0.5 to 2 mm in an average particle diameter. A particle diameter exceeding 2 mm is not preferable because an unnecessary load is applied in the next pulverizing step and a starch damage rate increases. Conversely, a particle diameter smaller than 0.5 mm is not preferable because adhesion is caused, in particular, at near an inlet of the mill in the next pulverizing step.

Note that, in the present invention, the disintegrating and sizing device is configured such that a rotating body and an opposite surface section opposed and separated from the rotating body by a predetermined gap are provided to form a gap region in a casing, the gap region is configured as a particle size adjustment region for allowing passage of particles matching the predetermined gap setting but disabling passage of particles not matching the predetermined gap setting, and the particles disabled to pass the gap region are brought into contact with, in an inlet section or a surface region section of the gap region, the opposite surface section in connection with turning of the rotating body, crushed to be capable of passing the gap region, and discharged from a discharge port. The average particle diameter is a value obtained by a sieving method.

As the disintegrating and sizing device, a Nebulasizer (registered trademark in Japan, JPO) produced by NARA MACHINERY CO., LTD. can be used. The Nebulasizer has a structure shown in FIG. 1.

That is, as shown in FIG. 1, the Nebulasizer includes a driving shaft 2 disposed in the horizontal direction in a casing 1, a rotor 3 fixedly supported by the driving shaft 2, and a stator 4 disposed over the entire circumference of the rotor 3 and having an inclined surface for reducing a gap with respect to a plate surface of the circumferential edge portion of the rotor 3 toward the peripheral edge. A gap section A, in which particulates are held up, is configured by a plate surface of the rotor 3 and the inclined surface of the stator 4. A disintegrating and sizing section B is configured by a narrowest gap section between the peripheral edge of the rotor 3 and the stator 4.

In the case of a small apparatus, as shown in FIG. 1, one rotor 3 is fixedly supported by the driving shaft 2. The driving shaft 2 is cantilevered. A material input port 5 is provided on a sidewall of the casing 1 near the driving shaft. A product discharge port 6 is opened in the vicinity just under the rotor 3.

In the case of an apparatus other than the small apparatus, although not shown in the figure, a plurality of rotors are fixedly supported by a driving shaft at a fixed interval. Stators are provided to be opposed to each other on both plate surfaces in peripheral edge portions of the rotors. Material input ports are provided on a sidewall of a casing near the driving shaft and a circumferential wall located between the rotors adjacent to each other. A product discharge port is opened in the vicinity just under the rotors.

Disintegrating pins 7 for primary crushing particulates and auxiliary pins 8 for pressing the particulates to the direction of disintegrating and sizing section(s) B are provided on a plate surface of the rotor(s) 3 (in the case of the small apparatus shown in FIG. 1, one surface opposite to the stator).

The rotor(s) 3 configuring the disintegrating and sizing section(s) B can be three kinds of rotors including a rotor having a flat sizing surface, a rotor having a sizing surface on which grooves are formed, and a rotor having a sizing surface on which protrusion sections are formed. Similarly, the stator 4 can be two kinds of stators including a stator having a flat sizing surface and a stator having a sizing surface on which protrusion sections are formed. The rotors and the stators can be respectively disposed according to characteristics of the particulates to be graded. Note that when the protrusion sections are provided in both of the rotor 3 and the stator 4, it is preferable that the protrusion sections provided on the surface of one of the rotor 3 and the stator 4 are arranged to pass among the protrusion sections provided on the surface of the other.

A method for primary crushing the material rice using the disintegrating and sizing device having the structure explained above is explained below.

First, after an interval between the rotor 3 and the stator 4 is set to a predetermined interval, the driving shaft 2 is rotated by a motor or the like. The rotor 3 fixed to the driving shaft 2 is rotated at a predetermined number of revolutions.

Subsequently, after a flow of the air involved in the rotation of the rotor 3 is stabilized, a fixed quantity of the material rice prepared in the step explained above is continuously fed into the casing 1 from the material input port 5. The material rice flowing into the casing 1 is subjected to a centrifugal force generated by the rotation of the rotor 3, blown in a radial direction from the center of the rotor 3, and divided into about two or four by the disintegrating pins 7 first. Then, the primary crushed rice reaching the gap section A between the plate surface of the rotor 3 and the inclined surface of the stator 4 is subjected to a treatment as if the primary crushed rice is wrapped and massaged by a pair of hands in the gap section A whose gap is getting narrower toward the circumferential edge of the rotor 3. In other words, the primary crushed rice is subjected to action like rubbing of the primary crushed rice between the plate surface of the rotor 3 and the inclined surface of the stator 4 (this action is referred to as "rubbing"). By applying the action to the primary crushed rice, it is possible to loosen and unfasten a tissue of a cell wall of the rice as in the case of the enzyme treatment.

Thereafter, the primary crushed rice is quickly pushed out to the disintegrating and sizing section B from the gap section A by the centrifugal force generated by the rotation of the rotor 3, a pushing-out force by the action of the auxiliary pins 8, and the like.

The primary crushed rice is pushed out into the disintegrating and sizing section B. Particles matching the gap setting are allowed to directly pass the disintegrating and sizing section B. On the other hand, particles not matching the gap setting are held between the plate surface of the rotor 3 and the plate surface of the stator 4 in the disintegrating and sizing section B, further subjected to the action of the rubbing, to be fined to size at least necessary for passing this narrowest gap section, smoothly discharged in the outer circumferential direction of the rotor 3, and discharged from the product discharge port 6 in a lower part.

The primary crushed rice subjected to the action of the rubbing by the disintegrating and sizing device to have the tissue of the cell wall loosened and unfastened can be naturally milled to fine flour in the next pulverizing step.

[Fine Grinding Step]

The primary crushed rice prepared in the step explained above is fine ground using an air mill.

The fine grinding using the air mill is preferably performed to fine grind the primary crushed rice to 200 mesh pass 60 to 90 weight %. A particle diameter exceeding the above particle diameter (coarse) is not preferable because, for example, a mixing degree with a sub-material such as gluten in making bread is deteriorated. Conversely, a particle diameter smaller than the above particle diameter (fine) is not preferable because the starch damage rate increases. From such a viewpoint, the pulverization performed using the air mill is more preferably performed to pulverize the primary crushed rice to 200 mesh pass 70 to 85 weight %.

Note that the air mill in the present invention is a device that forms a high-speed swirling air flow in a milling chamber with a blade rotating at high speed, causes a material to be milled while accompanying the swirling air flow, and repeatedly applies forces such as impact, shearing, and compression to thereby fine grinds the material and separates and discharges generated fine flour with a classifying mechanism. The particle diameter is a value obtained by a sieving method.

As an air mill, a PolvoGene (registered trademark in Japan, JPO) produced by NARA MACHINERY CO., LTD. can be used. The PolvoGene is a vertical type air mill incorporating a classifying mechanism and has a structure shown in FIG. 2.

Figure 2:
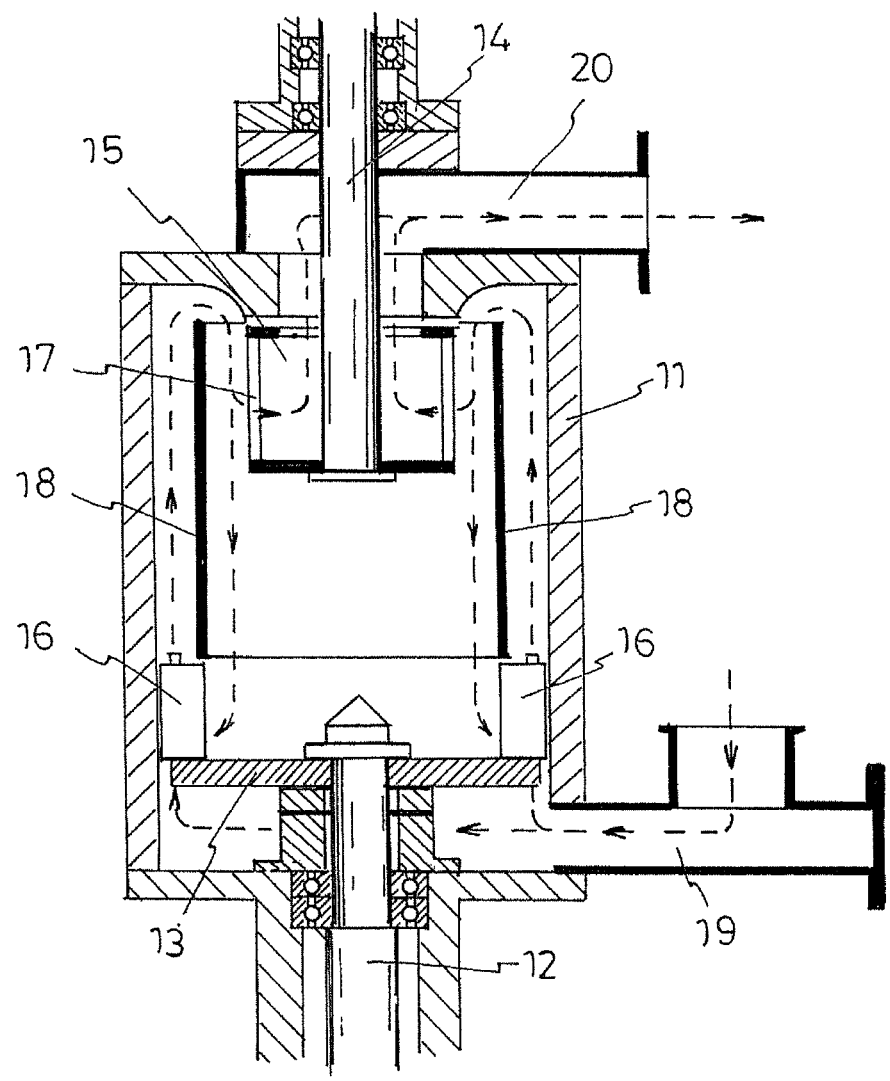
FIG. 2 is a longitudinal sectional view showing an air mill that can be suitably used in the method for producing rice flour according to the present invention.

That is, as shown in FIG. 2, a milling rotor 13 fixedly supported by a driving shaft 12 is disposed in a lower part of a cylindrical container 11, both end faces of which are closed, and a classifying cage 15 fixedly supported by a driving shaft 14 is disposed in an upper part of the cylindrical container 11. Milling blades 16 are disposed at an equal interval at the circumferential edge of the milling rotor 13. The classifying cage 15 is configured by classifying blades 17 disposed at an equal interval among upper and lower discs. A cylindrical classifying cone 18 is disposed above the milling blades 16 along the inner wall of the cylindrical container 11. An upper end portion of the classifying cone 18 surrounds the classifying blades 17.

A supply pipe 19 for a material feeding is connected to the sidewall of the cylindrical container 11 located in a lower part of the milling rotor 13. A discharge pipe 20 for a product is connected to the upper end face of the cylindrical container 11. The discharge pipe 20 is connected to an exhaust blower via a particle separator such as a cyclone and a pipe not shown in the figure. The inner surface (a stator) of the cylindrical container 11 opposite to the milling blades 16 may be smooth (flat) or may be grooved (with grooves) according to physical properties of an object to be treated.

A method of fine grounding of the primary crushed rice using the air mill having the structure explained above is explained below.

First, both the driving shafts 12 and 14 are rotated by respective motor or the like, the milling rotor 13 and the classifying cage 15 fixed to the respective driving shafts are respectively rotated at predetermined number of revolutions, and the not-shown exhaust blower is actuated to perform predetermined suction and exhaust from the inside of the mill.

Subsequently, after a flow of the air in the apparatus is stabilized, a fixed quantity of the primary crushed rice prepared in the step explained above is continuously supplied into the material supply pipe 19. The supplied primary crushed rice enters the cylindrical container 11 accompanying an air flow generated by a suction force of the not-shown exhaust blower, rises along the inner wall of the cylindrical container 11 while swirling, receives an impact force generated by the milling blades 16, and collides against the inner wall (the stator) of the cylindrical container 11 opposite to the milling blades 16 to be milled. Milled rice flour further rises along the inner wall of the cylindrical container 11 while swirling. When colliding against the upper end face of the cylindrical container 11, the milled rice flour changes the direction thereof to a downward direction along the upper end face of the cylindrical container 11. According to a balance of a centrifugal force generated by the rotation of the classifying blade 17 and centripetal force generated by suction power of the not-shown exhaust blower, large particles fall along the inner wall of the classifying cone 18 and are subjected to the impact force by the milling blades 16 again. On the other hand, fine particles enter the classifying cage 15, pass a gap between the driving shaft 14 of the classifying cage 15 and an opening at the top of the cylindrical container 11, and are collected by the not-shown particle separator such as the cyclone via the discharge pipe 20.

Note that the pulverizer is not limited to the one explained above. A normal air mill can be used. For example, the air mill may be a Super Powder Mill (produced by Nishimura Machine Works Co., Ltd.), a New Microcyclomat (produced by Masuno Seisakusho Ltd.), an ACM Pulverizer (Hosokawa Micron Co., Ltd.), or an Ultra Rotor.

[Drying Step]

The milled rice prepared in the step explained above is dried using an air flow dryer.

The drying of the milled rice performed using an air flow dryer preferably dries the milled rice to moisture content equal to or lower than 15 weight %. Rice flour having moisture content exceeding 15 weight % is not preferable because the rice flour with over 15 weight % is easily decomposed and therefore cannot be stored. From such a viewpoint and a viewpoint of economy in the drying step, it is more preferable to dry the milled rice using an air flow dryer to moisture content of 12 to 14 weight %.

Note that the air flow dryer in the present invention is configured to float, in a high-temperature dry air flow, a general material to be dried and dry the material while conveying the material. The moisture content is a value obtained by an infrared moisture meter.

As an air flow dryer, a Tornesh Dryer (registered trademark in Japan, JPO) produced by NARA MACHINERY CO., LTD. can be used. The Tornesh Dryer has a structure shown in FIG. 3.

Figure 3:
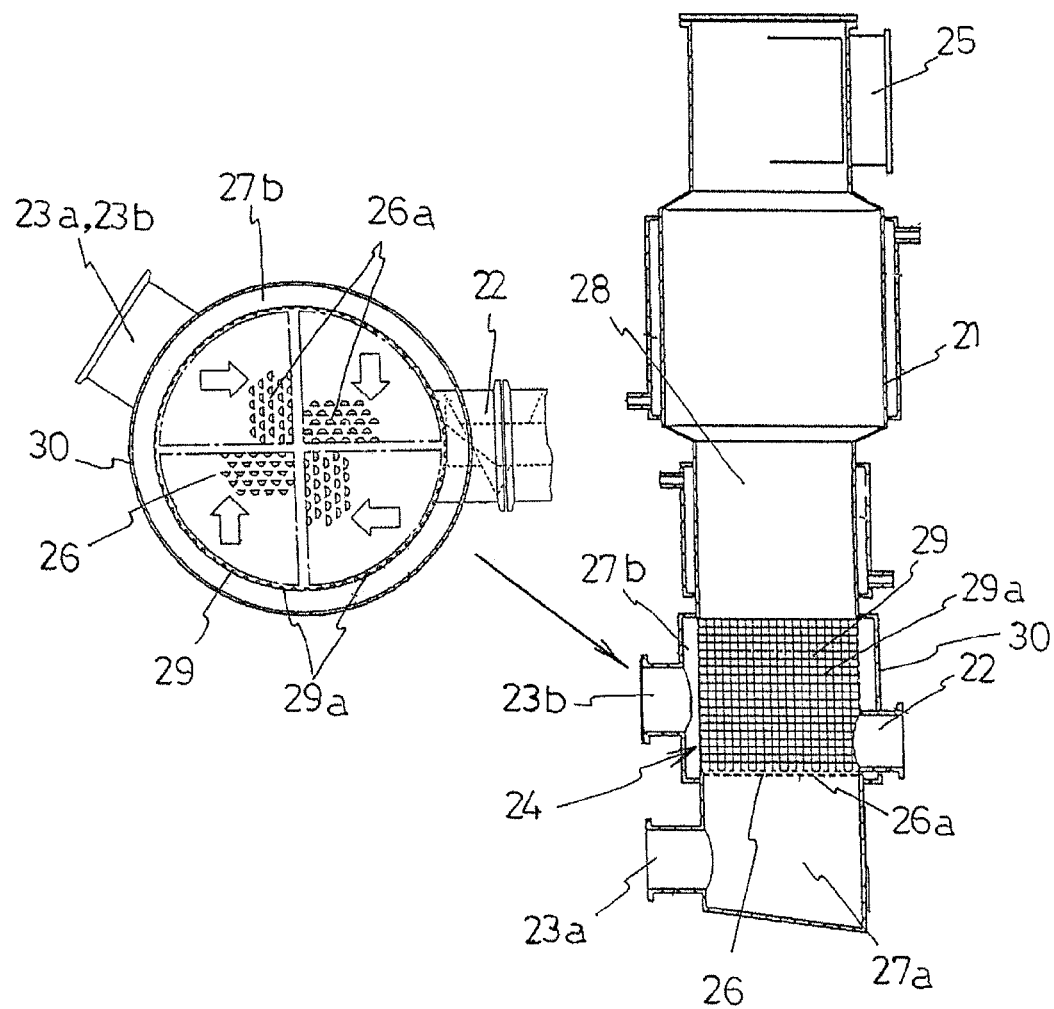
FIG. 3 is a longitudinal sectional view showing an air flow dryer that can be suitably used in the method for producing rice flour according to the present invention.

That is, as shown in FIG. 3, the Tornesh Dryer includes a cylindrical container 21 including an internal space, a horizontal section at any height of which is concentric, an introduction pipe 22 for particulates and introduction pipes 23a and 23b for heated gas connected to a lower part of the cylindrical container 21, a swirling mechanism 24 that changes the heated gas, which is introduced by the introduction pipes 23a and 23b, into a swirling ascending air current in the cylindrical container 21, and a discharge pipe 25 for particulates and heated gas connected to an upper part of the cylindrical container 21.

The swirling mechanism 24 is configured by a perforated plate.

That is, a perforated plate 26 is arranged in a lower part of the cylindrical container 21, both end faces of which are closed. The inside of the cylindrical container 21 is partitioned into a lower hot air chamber 27a and an upper drying chamber 28 by the perforated plate 26. The introduction pipe 23a for heated gas is connected to the hot air chamber 27a in a lower part of the cylindrical container. The air purified by a not-shown air filter and heated by an air heater is supplied to the hot air chamber 27a by blowing action of a supply blower via the introduction pipe 23a. On the perforated plate 26, a plurality of jetting ports 26a are formed such that the heated gas introduced into the drying chamber 28 from the hot air chamber 27a via the perforated plate 26 generates a swirling ascending air flow.

The inner circumferential wall surface of a container located just above the perforated plate 26 is configured by a perforated plate 29 in which jetting ports 29a same as the jetting ports 26a are formed over the entire circumference of the inner circumferential wall surface at fixed width. A plurality of the jetting ports 29a of the perforated plate 29 are arranged such that openings of the jetting ports 29a regularly correctly face one of tangential directions of the container. The circumference of the perforated plate 29 configuring the lower inner circumferential wall surface of the cylindrical container 21 is completely covered by a container 30 over the entire circumferential width. A hot air chamber 27b is formed between the container 30 and the perforated plate 29. Like the hot air chamber 27a, the introduction pipe 23b for heated gas is connected to the hot air chamber 27b. The air purified by the not-shown air filter and heated by the air heater is supplied by the blowing action of the supply blower via the introduction pipe 23b. The heated air supplied into the drying chamber 28 via the perforated plate 29 forms a swirling air flow substantially in the horizontal direction in the same direction as the swirling air flow formed in the drying chamber 28 by the perforated plate 26.

The introduction pipe 22 that supplies wet particulates, which are objects to be treated, to the drying chamber 28 is connected to the side surface of the container 30, which covers the perforated plate 29, in a state in which the introduction pipe 22 pierces through the container 30 and the perforated plate 29 present on the inner side of the container 30. A not-shown fixed quantity supply machine for particulates such as a screw conveyor is connected to the introduction pipe 22.

The discharge pipe 25 is connected to the top sidewall of the cylindrical container 21 in a tangential direction in the same rotating direction as the swirling ascending air flow formed in the cylindrical container 21. The discharge pipe 25 is connected to the exhaust blower via the particle separator such as the cyclone and the pipe not shown in the figure.

A method of drying the fine ground rice using the air flow dryer having the structure explained above is explained below.

First, the not-shown supply blower is actuated to supply the air purified by the air filter and heated by the air heater to the hot air chambers 27a and 27b respectively via the introduction pipes 23a and 23b. Then, the not-shown exhaust blower is actuated to suck and exhaust the heated gas of the same quantity as the heated gas supplied from the drying chamber 28 to the hot air chambers 27a and 27b through the discharge pipe 25 and the particle separator and the pipe not shown in the figure. When the drying chamber 28 has a jacket structure, hot water heated at a fixed temperature is continuously supplied to the jacket.

The heated air supplied to the hot air chamber 27a jets from the jetting ports 26a of the perforated plate 26 into the drying chamber 28 and forms a high-speed swirling ascending air flow above the perforated plate 26. The heated air supplied to the hot air chamber 27b also jets from the jetting ports 29a of the perforated plate 29 into the drying chamber 28 and forms an air flow swirling at high speed in the circumferential direction along the perforated plate 29. Both the heated airs ascend while swirling along the wall surface of the drying chamber 28 and are exhausted to the outside of the system from the exhaust blower from the discharge pipe 25 through the particle separator and the pipe not shown in the figure.

After the temperature in the drying chamber 28 reaches a predetermined level and the swirling ascending air flow is stabilized, the not-shown fixed quantity supply machine is actuated to continuously supply a controlled amount of rice flour that is fine ground in the step explained above from the introduction pipe 22 for particulates to the drying chamber 28. The rice flour supplied into the drying chamber 28 is instantaneously forcibly dispersed by the heated air swirling at high speed in the circumferential direction along the perforated plate 29 and rides on the swirling ascending air flow by the heated air formed in the drying chamber 28. In this case, the supplied fine ground rice receives a centrifugal force from the swirling ascending air flow and performs an intense swirling motion along the perforated plate 29. Since the heated air is continuously jetted from the perforated plate 29, the rice flour is not brought into press contact with the perforated plate 29. Since the action of the gravity and the centrifugal force received from the swirling ascending air flow are intense, while the rice flour riding on the swirling ascending air flow is wet and has high density, the rice flour is held up while swirling at substantially the same horizontal plane in the drying chamber 28 and is subjected to drying action by heat energy carried in by the heated air.

Since the action of the gravity and the centrifugal force received from the swirling ascending air flow decreases and the rice flour is continuously supplied from the introduction pipe 22 for particulates, the rice flour supplied earlier and dried to be light in weight moves in the center direction and moves upward in the drying chamber 28 accompanying the air flow that ascends while swirling. The rice flour moved upward is discharged through the discharge pipe 25, separated from the air flow by a not-shown particle separator, and collected as fine dried rice flour.

Note that the dryer is not limited to the one explained above. A normal air flow dryer can be used. For example, the dryer may be a flash dryer, a fluidized bed dryer, a cyclone dryer, a band dryer, and a rotary dryer.

The rice flour produced as explained above is fine flour having a repose angle equal to or smaller than 50 degrees, a starch damage rate equal to or lower than 5%, small surface roughness, and a rounded shape. Therefore, this rice flour is not inferior to the rice flour obtained by the enzyme treatment and has high-quality suitable for production of bread, cakes, noodles, and the like.

TEST EXAMPLES

1. Rice Flour Producing Test A

As rice, "Koshiibuki (a polished rice product)" produced in Niigata Prefecture was used. The rice is the same as material rice of rice flour subjected to the enzyme treatment in a comparative example 1.

For the primary crushing, the Nebulasizer (the diameter of the rotor: 100 mm, model: NS-mini), which was the disintegrating and sizing device, produced by NARA MACHINERY CO., LTD. was used.

For the pulverization, the PolvoGene (the inner diameter of the cylindrical container: 240 mm, the diameter of the disintegrating rotor: 235 mm, the diameter of the classifying cage: 125 mm, model: PG-3), which was the air mill, produced by NARA MACHINERY CO., LTD. was used.

For the drying, the Tornesh Dryer (the inner diameter of the straight body section: 200 mm, model: TRD-200), which was the air flow dryer, produced by NARA MACHINERY CO., LTD. was used.

Note that the soaking step explained below was applied to the material rice.

First, a bag-like net including 5 kg of the material rice was immersed in a container filled with tap water and was rub-washed by hands. Washing of the material rice was performed by repeating above operation three times.

Subsequently, 10 kg of the material rice kept in the net was immersed in another container including 12 kg of 40° C. hot water. At this point, the material rice was completely immersed in the water under the water surface. After 60 minutes elapsed, the net including the material rice was pulled up. The centrifuged and dehydrated material rice was used as a material in the next primary crushing step.

Note that the moisture content of the material rice after the centrifuging and dehydration was 25 to 32 weight %.

The other test conditions were as shown in Table 1 below.

TABLE 1

| | Test No. | TEST-1 | TEST-2 | TEST-3 | TEST-4 | TEST-5 |
|---|---|---|---|---|---|---|
| Primary crushing | Rotating speed of rotor [min$^{-1}$] | 4700 | 4700 | 4700 | 4700 | 4700 |
| | Outer circumferential speed of rotor [m/sec] | 24.6 | 24.6 | 24.6 | 24.6 | 24.6 |
| | Plate surfaces of rotor and stator | Protrusion section | Protrusion section | Protrusion section | Protrusion section | Protrusion section |
| | Interval of rotor and stator [mm] | 4 | 4 | 4 | 4 | 4 |
| | Disintegrating pin/auxiliary pin | Present | Present | Present | Present | Present |
| | Process capacity [kg/h] | 19.7 | 19.7 | 19.7 | 19.7 | 19.7 |
| Fine grinding | Milling rotor rotating seed [min$^{-1}$] | 7380 | 5740 | 7380 | 7380 | 7380 |
| | Milling rotor outer circumferential speed [m/sec] | 90.8 | 70.6 | 90.8 | 90.8 | 90.8 |
| | Classifying cage rotating speed [min$^{-1}$] | 400 | 400 | 400 | 400 | 400 |
| | Classifying cage outer circumferential speed [m/sec] | 2.6 | 2.6 | 2.6 | 2.6 | 2.6 |
| | Plate surface of stator | Flat | Flat | With groove | Flat | Flat |
| | Suction air quantity [m$^3$/min] | 6.0 | 6.0 | 6.0 | 8.0 | 6.0 |
| | Process capacity [kg/h] | 87 | 87 | 87 | 87 | 87 |
| Drying | Hot air temperature [° C.] | 100 | 100 | 100 | 100 | 100 |
| | Exhaust air temperature [° C.] | — | — | — | — | — |
| | Supply quantity [kg/h] | 100 | 100 | 100 | 100 | 100 |
| | Test No. | TEST-6 | TEST-2 | TEST-8 | | |
| Primary crushing | Rotating speed of rotor [min$^{-1}$] | 4700 | 4700 | 4700 | | |
| | Outer circumferential speed of rotor [m/sec] | 24.6 | 24.6 | 24.6 | | |
| | Plate surfaces of rotor and stator | Protrusion section | Protrusion section | Protrusion section | | |
| | Interval of rotor and stator [mm] | 4 | 4 | 4 | | |
| | Disintegrating pin/auxiliary pin | Present | Present | Present | | |
| | Process capacity kg/h | 40 to 50 | 40 to 50 | 40 to 50 | | |
| Fine grinding | Milling rotor rotating seed [min$^{-1}$] | 5740 | 7380 | 5740 | | |
| | Milling rotor outer circumferential speed [m/sec] | 70.6 | 90.8 | 70.6 | | |
| | Classifying cage rotating speed [min$^{-1}$] | 400 | 400 | 2000 | | |
| | Classifying cage outer circumferential speed [m/sec] | 2.6 | 2.6 | 13.1 | | |
| | Plate surface of stator | Flat | Flat | Flat | | |
| | Suction air quantity [m$^3$/min] | 6.0 | 6.0 | 6.0 | | |
| | Process capacity [kg/h] | 89 | 83 | 14 | | |
| Drying | Hot air temperature [° C.] | 110 | 110 | 110 | | |
| | Exhaust air temperature [° C.] | 51 | 57 | 53 | | |
| | Supply quantity [kg/h] | 94 | 94 | 116 | | |

Concerning obtained rice flour, moisture content, a repose angle, particle size, a water absorption rate, a starch damage rate, and an external appearance were measured or evaluated. Results of the measurement or evaluation are described in Table 2.

As a comparative example 1, concerning commercially available rice flour (Powder Rice C produced by Niigata Seifun Co., Ltd.) obtained by enzyme treatment, moisture content, a repose angle, particle size, a water absorption rate, a starch damage rate, and an external appearance were measured or evaluated. Results of the measurement or evaluation are also described in Table 2.

Note that the measurement or the evaluation of the moisture content, the repose angle, and the like was performed by methods explained below.

Moisture Content

For the measurement of the moisture content, an infrared moisture meter (produced by Kett Electric Laboratory, model: FD620) was used.

Bulk Density, Tapped Density, a Repose Angle

For the measurement of the bulk density, the Tapped density, and the repose angle, a Power Tester (produced by Hosokawa Micron Co., Ltd., model: PT-E) was used.

Particle Size

The measurement of the particle size was performed by a method explained below.

After sieving the rice flour for ten minutes using a Ro-tap shaker with a standard screen of 200 mesh (nominal dimension: 75 μm), the rice flour left on the screen was brushed manually until no more fallen powder. Thereafter, the weights of the flour of plus size and minus size were measured, in this way a rate of 200 mesh pass was calculated.

Water Absorption Rate (A Centrifugal Method)

The measurement of the water absorption rate (a centrifugal method) was performed by a method explained below.

3 g of the rice flour was metered in a centrifuge tube. After the rice flour added with 30 ml of distilled water was strongly agitated, the tube was left untouched for 20 to 24 hours at the room temperature before being put in a centrifuge. After centrifugal separation was performed, supernatant liquid was discarded, the tube was strongly shaken, the weight of the rice flour was measured after no water spilt, and an increase in the weight was identified as a water absorption amount. A value obtained by dividing the water absorption amount by a metered amount was identified as a water absorption rate.

The measurement was performed six times concerning the respective rice flours. Averages of the measurement were used as a result.

Water Absorption Rate (A Farinograph)

The measurement of the water absorption rate (the farinograph) was performed by a method explained below using a Dough Coder produced by Brabender GmbH&Co.

Mixing was performed while adding water to 200 g of the rice flour. The amount of water added at a moment when a figure became 180 B.U. was identified as a measurement value. The measurement value was divided by a metered value of the rice flour to obtain a water absorption rate.

The measurement was performed three times concerning the respective rice flours. Averages of the measurement were used as a result.

Starch Damage Rate

The measurement of the starch damage rate was performed by a method explained below using a "damaged starch measurement kit (produced by Megazymes)".

(1) 100±10 mg of the rice flour is metered in a test tube and the weight of the rice flour is measured.

(2) The rice flour is pre-heated for five minutes in a hot water bath at 40° C. (a α-amylase solution is also pre-heated).

(3) 1 ml of the α-amylase solution (50 μ/ml) is added to the test tube and the test tube was agitated for about 5 seconds by a test tube mixer. Thereafter, the test tube was kept in the hot water bath at 40° C. and caused reaction for 10 minutes in total.

(4) 8 ml of a 0.2 v/v % sulfuric acid solution is added to the test tube and the test tube is agitated for 5 seconds to stop the enzyme reaction of the α-amylase.

(5) The test tube is centrifuged for 5 minutes at 3000 rpm (1000 G).

(6) 0.1 ml of supernatant liquid of the test tube is metered in two test tubes respectively.

(7) 0.1 ml of an amyloglucosidase solution (20 μ/ml) is added to each of the test tubes and, after being agitated by the test tube mixer, and kept still for the reaction for 10 minutes at 40° C.

(8) 4 ml of a GOD-POD solution is added to each of the test tubes and kept still for the reaction for 20 minutes at 40° C.

(In this case, 0.1 ml of distilled water used as a reagent blank and 1.5 mg/ml of a glucose solution used as a standard solution, which are respectively specimens, are simultaneously prepared and caused to react in the same manner.)

(9) Absorbance is measured at a wavelength of 510 nm using a spectrophotometer.

(10) A starch damage rate is calculated by the following calculation formula:

$$\text{Starch damage rate } (\%) = \Delta E \times F \times 90 \times (1/1000) \times (100/W) \times (162/180) \; (= \Delta E \times F/W \times 8.1)$$

$\Delta E$: Absorbance difference between a sample and the reagent blank

F: 150 (μg of glucose)/absorbance of a glucose standard liquid sample

W: Metered rice flour weight (mg)

The measurement was performed three times concerning the respective rice flours. Averages of the measurement were used as a result.

A standard product (a damaged starch amount of which is known) attached to the kit was simultaneously measured. A measurement value was corrected.

External Appearance Observation

The external appearance of the rice flour was observed by a scanning electron microscope (JSM-5600LV type: produced by JEOL Ltd.).

TABLE 2

|  | Test No. | | | | |
| --- | --- | --- | --- | --- | --- |
|  | TEST-1 | TEST-2 | TEST-3 | TEST-4 | TEST-5 |
| Moisture content [% WB] | 11.0 | 12.5 | 9.6 | 10.4 | 11.4 |
| Bulk density [kg/m$^3$] | 534 | 536 | 498 | 481 | 507 |
| Tapped density [kg/m$^3$] | 808 | 813 | 770 | 773 | 796 |
| Repose angle [degree] | 50 | 50 | 53 | 50 | 48 |
| 200 mesh pass [%] | 75.5 | 69.3 | 89.4 | 83.2 | 79.0 |
| Water absorption rate (farinograph) [%] | 83.7 | — | — | 84.1 | 83.3 |

TABLE 2-continued

| | | | | | |
|---|---|---|---|---|---|
| Water absorption rate (centrifugal method) [g/g] | 0.900 | 0.894 | — | 0.919 | 0.896 |
| Starch damage rate [%] | 3.4 | 2.6 | — | 2.6 | 2.5 |

| | Test No. | | | |
|---|---|---|---|---|
| | TEST-6 | TEST-7 | TEST-8 | Comparative example 1 |
| Moisture content [% WB] | 11.3 | 10.1 | 9.5 | 11.4 |
| Bulk density [kg/m³] | 549 | 550 | 546 | 478 |
| Tapped density [kg/m³] | 821 | 826 | 924 | 719 |
| Repose angle [degree] | 49 | 48 | 55 | 50 |
| 200 mesh pass [%] | 76.5 | 77.4 | 83.3 | 85.0 |
| Water absorption rate (farinograph) [%] | — | — | — | 82.4 |
| Water absorption rate (centrifugal method) [g/g] | — | — | — | 0.817 |
| Starch damage rate [%] | 2.6 | 2.6 | 5.9 | 2.6 |

Note:
"—" indicates not-measured.

2. Bread Making Test A

Bread making tests were performed under the same conditions at compounding ratios of Table 3 below using the rice flours of the above TEST-6, TEST-7, and TEST-8 of different producing conditions.

TABLE 3

| Test No. | TEST-6 | TEST-7 | TEST-8 |
|---|---|---|---|
| Rice flour | | 80.0 | |
| Shitogi gluten mix | | 20.0 | |
| White soft sugar | | 7.0 | |
| Salt | | 1.8 | |
| Skim milk powder | | 3.0 | |
| Raw yeast | | 2.5 | |
| Compound margarine | | 7.0 | |
| Water | 74.0 | 74.0 | 76.0 |

Note that the recipe of bread making is explained below.

(1) All the raw materials were simultaneously input to a mixer and kneaded (a kneading temperature was 26 to 28° C.) to prepare dough.

(2) The dough was divided into a divided specific volume of 3.7 without a floor time then rounded. After a bench time of 15 minutes, the dough was put in a bread pan and made a form of round-top loaf bread.

(3) Fermentation was performed for 60 minutes in a fermenter at 40° C. and humidity of 80%.

(4) After the fermentation ended, the dough was baked for 35 minutes in an oven at 190° C. of top burner and 220° C. of bottom burner to turn out round-top loaf bread.

Results of bread making tests of round-top loaf bread using three kinds of rice flours are as explained below.

Round-Top Loaf Bread Produced Using the Rice Flour of TEST-6 (Evaluation: Very Good)

An added water quantity was a normal added water quantity of 74% (enzyme-treated rice flour of the comparative example 1).

The dough had little stickiness and stretched well.

The rise of the baked bread was 15.1 cm and substantially the same as the normal rise (15.4 cm).

The inner texture was fine and the finish of the bread was very good.

Round-Top Loaf Bread Produced Using the Rice Flour of TEST-7 (Evaluation: Very Good)

An added water quantity was a normal added water quantity of 74%. The dough had little stickiness and stretched well.

The rise of the baked bread was 14.7 cm and lower than the rise of TEST-6. However, there was no particular problem.

The inner texture was fine and the finish of the bread was very good. There was almost no difference from TEST-6.

Round-Top Loaf Bread Produced Using the Rice Flour of TEST-8 (Evaluation: Fair)

An added water quantity was 76% and more than the normal added water quantity. The dough had stickiness and adhered to the hands. However, when dusted with flour, the stickiness was not bothering. The dough stretched well.

The rise of the bread was 13.5 cm and did not grow much in a bread pan.

The inner texture was rough compared with TEST-6 and TEST-7 and the finish of the bread was not so good.

This is considered to be because, since the number of revolutions of the classifying cage was increased and a cut point was reduced in order to reduce the product particle size in the fine grinding step, the rice flour repeatedly circulated in the mill, received the impact force by the milling blade, and collided against the inner wall (the stator) of the cylindrical container opposed to the milling blade, whereby the starch damage rate increased (exceeded 5%).

3. Rice Flour Producing Test B

In order to observe an influence of rice washing and immersion conditions on the produced rice flour, tests were performed by changing these conditions.

For the rice washing, a dry-type no-wash rice finisher (model: MRT-3EB) produced by Marumasu Kikai Co., Ltd. was used.

For the primary crushing, the Nebulasizer (the diameter of the rotor: 270 mm, model: NS-20), which was the disintegrating and sizing device, produced by NARA MACHINERY CO., LTD. was used.

The material rice, and apparatuses used for fine grinding, and drying were the same as described in the rice flour producing test A.

Conditions concerning the rice washing and the immersion were as shown in Table 4 below.

In the table, a "wet type" means a method of washing rice using water same as the water used in the rice flour producing test A. A "no-wash rice machine" indicates use of the dry-type no-wash rice finisher (hereinafter referred to as no-wash rice machine). Note that test conditions for the no-wash rice machine are a notch: 6. And the process capacity (supply speed of rice): 280 to 290 kg/h.

The other test conditions are shown in Table 5 below.

TABLE 4

| | Test No. | | | | |
|---|---|---|---|---|---|
| | TEST-11 | TEST-12 | TEST-13 | TEST-14 | Comparative example 2 |
| Rice washing method | Wet type | No-wash rice machine | Wet type | Wet type | No-wash rice machine |

TABLE 4-continued

| | Test No. | | | | |
|---|---|---|---|---|---|
| | TEST-11 | TEST-12 | TEST-13 | TEST-14 | Comparative example 2 |
| Immersion water quantity [kg-rice/kg-water] | Conventional machine | Conventional machine | Conventional machine | Conventional machine | No immersion |
| Immersion time [min] | 60 | 60 | 15 | 60 | — |
| Immersion temperature [° C.] | 40 | 40 | 40 | 40 | 40 |
| Moisture content after dehydration [% WB] | 29.4 | 29.5 | 27.3 | 29.3 | (12.0) |
| Remarks | Immersed at room temperature | | Immersed in thermostatic chamber at 45° C. | | — |

Note:
A moisture content of a comparative example 2 is a moisture content of the material rice.

TABLE 5

| | Test No. | TEST-11 | TEST-12 | TEST-13 | TEST-14 | Comparative example 2 |
|---|---|---|---|---|---|---|
| Primary crushing | Rotating speed of rotor [min⁻¹] | 2500 | 2500 | 2500 | 2500 | 2500 |
| | Outer circumferential speed of rotor [m/sec] | 35.3 | 35.3 | 35.3 | 35.3 | 35.3 |
| | Plate surfaces of rotor and stator | Protrusion section | Protrusion section | Protrusion section | Protrusion section | Protrusion section |
| | Interval of rotor and stator [mm] | 4 | 4 | 4 | 4 | 4 |
| | Disintegrating pin/auxiliary pin | Present | Present | Present | Present | Present |
| | Process capacity [kg/h] | 1157 | 924 | 1070 | 1248 | 877 |
| Fine grinding | Milling rotor rotating seed [min⁻¹] | 7380 | 7380 | 7380 | 7380 | 7380 |
| | Milling rotor outer circumferential speed [m/sec] | 90.8 | 90.8 | 90.8 | 90.8 | 90.8 |
| | Classifying cage rotating speed [min⁻¹] | 400 | 400 | 400 | 400 | 400 |
| | Classifying cage outer circumferential speed [m/sec] | 2.6 | 2.6 | 2.6 | 2.6 | 2.6 |
| | Plate surface of stator | Flat | Flat | Flat | Flat | Flat |
| | Suction air quantity [m³/min] | 8.0 | 8.0 | 8.0 | 8.0 | 8.0 |
| | Process capacity [kg/h] | 77 | 77 | 85 | 80 | 67 |
| Drying | Hot air temperature [° C.] | 100 | 100 | 100 | 100 | — |
| | Exhaust air temperature [° C.] | 56 | 56 | 55 | 56 | — |
| | Supply quantity [kg/h] | 100 | 100 | 100 | 100 | — |

Note:
Drying is unnecessary in the comparative example 2.

Concerning obtained rice flour, moisture content, a repose angle, particle size, a water absorption rate, a starch damage rate, and an external appearance were measured or evaluated. Results of the measurement or evaluation are described in Table 6.

As a comparative example 2, concerning rice flour obtained by a treatment method without use of water (rice washing by the no-wash rice machine, no immersion), moisture content, a repose angle, particle size, a water absorption rate, a starch damage rate, and an external appearance were measured or evaluated in the same manner as explained above. Results of the measurement or evaluation are also described in Table 6.

Note that the measurement or the evaluation of the moisture content, the repose angle, and the like was performed by methods same as the methods described in the rice flour producing test A.

TABLE 6

| | Test No. | | | | |
|---|---|---|---|---|---|
| | TEST-11 | TEST-12 | TEST-13 | TEST-14 | Comparative example 2 |
| Moisture content [% WB] | 10.0 | 10.2 | 10.6 | 10.4 | 10.6 |
| Bulk density [kg/m³] | 515 | 526 | 525 | 489 | 630 |
| Tapped density [kg/m³] | 994 | 830 | 850 | 822 | 817 |
| Repose angle [degree] | 54 | 56 | 53 | 53 | 44 |
| 200 mesh pass [%] | 79.8 | 79.2 | 76.8 | 85.0 | 41.2 |
| Water absorption rate (farinograph) [%] | — | — | — | — | — |

TABLE 6-continued

| | Test No. | | | | |
|---|---|---|---|---|---|
| | TEST-11 | TEST-12 | TEST-13 | TEST-14 | Comparative example 2 |
| Water absorption rate (centrifugal method) [g/g] | — | — | — | — | — |

TABLE 6-continued

| | Test No. | | | | |
|---|---|---|---|---|---|
| | TEST-11 | TEST-12 | TEST-13 | TEST-14 | Comparative example 2 |
| Starch damage rate [%] | 2.7 | 2.8 | 3.9 | 2.7 | 8.4 |

Note:
"—" indicates not-measured.

4. Bread Making Test B

Bread making tests were performed under the same conditions at compounding ratios of Table 7 below using the rice flours of the above TEST-11, TEST-12, TEST-14, and the comparative example 2 of different producing conditions.

TABLE 7

| | Test No. | | | |
|---|---|---|---|---|
| | TEST-11 | TEST-12 | TEST-14 | Comparative example 2 |
| Rice flour | | 80.0 | | |
| Shitogi gluten mix | | 20.0 | | |
| White soft sugar | | 8.0 | | |
| Salt | | 2.0 | | |
| Skim milk powder | | 3.0 | | |
| Raw yeast | | 3.0 | | |
| Shortening | | 8.0 | | |
| Water | 74.0 | 74.0 | 74.0 | 71.0 |

Note that the recipe of bread making is same as the recipe described in the bread making test A except that the compound margarine is replaced with shortening, the temperature of the fermenter is 38° C., and the temperature of bottom burner in the oven during baking is 210° C.

Results of bread making tests of round-top loaf bread produced using four kinds of rice flours were as explained below.

Round-Top Loaf Bread Produced Using the Rice Flour of TEST-11 (Evaluation: Very Good)

An added water quantity was a normal added water quantity of 74%. The dough had hardness same as normal hardness. The dough has a little stickiness. However, the stickiness was at an allowable level.

The rise of the baked bread was 17.8 cm. The inner texture was fine and the finish of the bread was very good.

Round-Top Loaf Bread Produced Using the Rice Flour of TEST-12 (Evaluation: Very Good)

An added water quantity was a normal added water quantity of 74%. The dough had hardness same as normal hardness. The dough had little stickiness and stretched well.

The rise of the baked bread was 17.7. The inner texture was fine and the finish of the bread was very good.

Round-Top Loaf Bread Produced Using the Rice Flour of TEST-14 (Evaluation: Very Good)

An added water quantity was a normal added water quantity of 74%. The dough had hardness same as normal hardness. The dough had little stickiness and stretched well.

The rise of the baked bread was 17.2, which was lower than those in TEST-11 and TEST-12. However, there was no particular problem. The inner texture was fine and the finish of the bread was very good. There was no difference from TEST-11 and TEST-12.

Round-Top Loaf Bread Produced Using the Rice Flour of the Comparative Example 2 (Evaluation: Bad)

Although the starch damage rate was high, an added water quantity was as low as 71%.

The rise of the baked bread was 13.1 cm, which was extremely low compared with the other rice flours.

The water absorption quantity was small. This is considered because the particle diameter of the rice flour was large, only the surface of particles changed into alpha starch, and the water absorption quantity of the entire dough decreased. Therefore, sufficient water was not supplied to gluten that formed a network and a skeleton, thus the bread contracted.

5. Test results (results)

The starch damage rates of the rice flours obtained by the production method according to the present invention were successfully lower than the target value of 5% and were not inferior to the enzyme-treated rice flour in the comparative example 1 (2.6%) (except TEST-8 whose target was a finer particle size of rice flour).

The repose angles of the rice flours obtained by the production method according to the present invention were around 50 degrees, which was the same as that of the enzyme-treated rice flour in the comparative example 1 (50 degrees).

Furthermore, the water absorption rates measured by the farinograph were substantially the same as that of the enzyme-treated rice flour in the comparative example 1 (82.4%).

Figure 4:
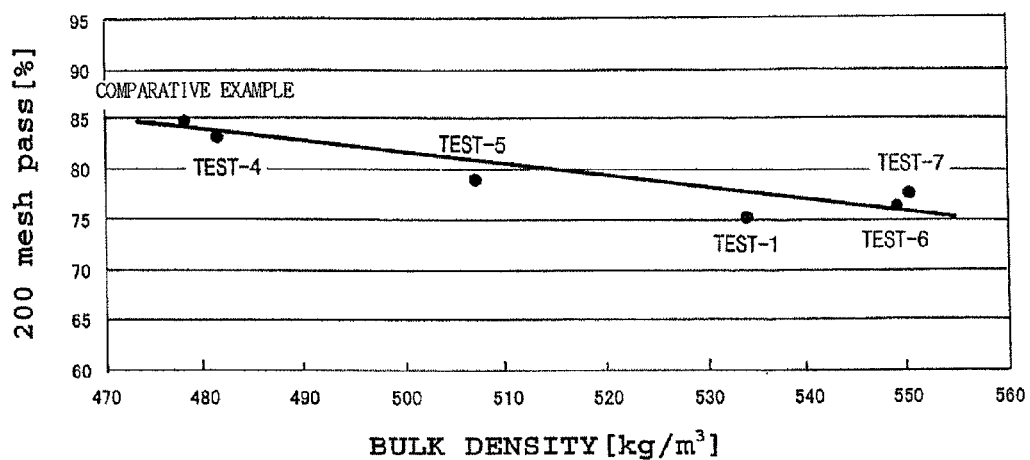
FIG. 4 is a graph showing a relation between the bulk density of rice flour and 200 mesh pass in a test example.

The bulk density is generally larger as the particle size is larger. However, as explained above, in the tests including the comparative example 1 excluding an exception, a good correlation was observed between the bulk density and the 200 mesh pass as shown in FIG. 4.

Figure 5:
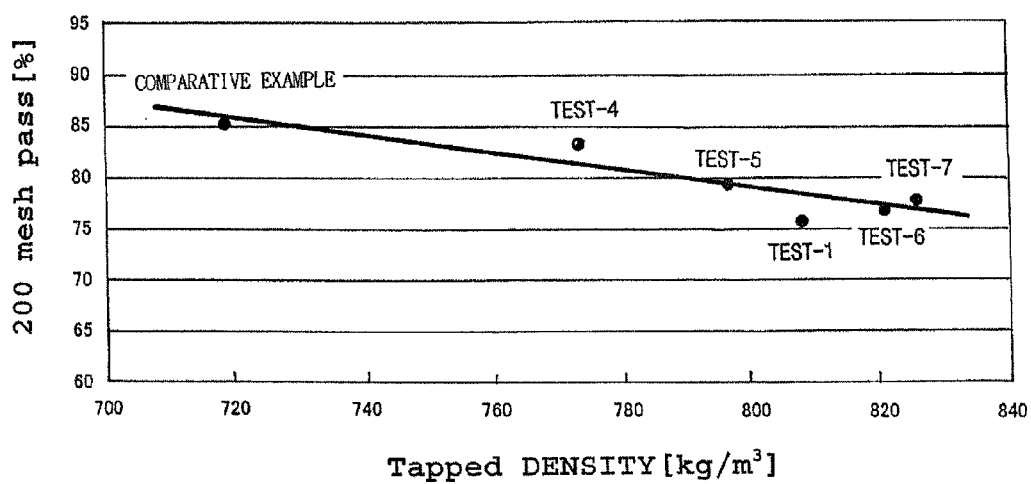
FIG. 5 is a graph showing a relation between the Tapped density of the rice flour and 200 mesh pass in the test example.

Similarly, a good correlation was observed between the Tapped density and the 200 mesh pass as shown in FIG. 5. From such relations, it is surmised that the rice flours obtained by the production method according to the present invention are fine flours having small surface roughness and a rounded shape. This was verified by the external appearance observation by the scanning electron microscope.

From the above, it has been found that, with the method of the present invention, it is possible to obtain, only with mechanical treatment without using expensive enzymes, high-quality rice flour suitable for production of bread, cakes, noodles, and the like equivalent to the enzyme-treated rice flour.

The rice flour obtained by the production method according to the present invention can be directly used as wheat alternative flour and can also be used by being mixed with wheat flour or a base of mix flour to be mixed with a sub-material such as gluten or fat and oil. A range of use of the rice flour is wide.

Even when the no-wash rice machine (bran remover with no water) was used, the rice flour having substantially equivalent starch damage rate and particle size was successfully obtained by setting the immersion condition same as the immersion condition in washing rice using water.

It has been found accordingly that it is possible to keep an environmental load low because, by using a rice polishing machine without using water, there is no drainage of waste water, so-called water after washing rice including phosphorus, nitrogen, and the like, which are ingredients of bran, hard to be purified, and cause water contamination. It is also possible to keep facility cost and running cost for waste water treatment low.

On the other hand, it has been verified from the comparison of the comparative example 2 and the other test examples, immersion of rice in water is necessary and indispensable.

It has also been verified that, by keeping an ambient temperature during immersion high, that is, by not lowering a water temperature during immersion, even a relatively short immersion time of 15 minutes is sufficient to soften the rice for easy disintegrating and milling.

Consequently, it has been found that it is possible to make a small immersion facility.

INDUSTRIAL APPLICABILITY

With the method for producing rice flour according to the present invention explained so far, it is possible to produce, only with mechanical treatment, high-quality rice flour having a rounded particle shape, which is equivalent to fine flour obtained by using enzymes, has characteristics close to the characteristics of wheat flour, and is suitable for production of bread, cakes, noodles, and the like. The rice flour can be directly used as wheat alternative flour and can also be used by being mixed with wheat flour or a base of mix flour to be mixed with a sub-material such as gluten or fat and oil. A range of use of the rice flour is wide.

The invention claimed is:

1. A method for producing rice flour, which comprises steps including:
   soaking of material rice and removing at least one of oil content, bran and microorganisms from the material rice and obtaining a soaked material rice,
   adjusting moisture content of the soaked material rice to obtain a soaked and moisture-adjusted material rice,
   primary crushing of the soaked and moisture-adjusted material rice using a disintegrating and sizing device and obtaining a primary crushed rice having a smaller size than the soaked and moisture-adjusted material rice, the primary crushing step including:
      feeding the soaked and moisture-adjusted material rice into a particle size adjustment region of the disintegrating and sizing device, the particle size adjustment region including a gap region terminating in a gap of a predetermined size provided between a rotating surface of a rotating body and an opposite surface, the opposite surface being a surface selected from surfaces of an inlet section and a region of a section that extends from a casing of the disintegrating and sizing device into the gap region,
      allowing passage of finely rice particles matching the predetermined op size through the particle size adjustment region and discharging the particles matching the predetermined gap size through a discharge port,
      retaining finely ground rice particles not matching the predetermined gap size within the particle size adjustment region,
      disintegrating retained particles not matching the predetermined gap size into the particles matching the predetermined gap size by contacting the retained particles between the rotating surface and the opposite surface while rotating the rotating body, and
      discharging the disintegrating particles matching the predetermined gap size through the discharge port,
   fine grinding of the primary crushed rice using an air mill and obtaining a finely ground rice having a smaller size than the primary crushed rice, and
   drying the finely ground rice using an air flow dryer.

2. The method for producing rice flour according to claim 1, wherein the step of adjusting moisture content of the soaked material rice adjusts the moisture content of the soaked material rice is to 20 to 35 weight %.

3. The method for producing rice flour according to claim 1, wherein the primary crushed rice obtained in the primary crushing step has an average particle diameter of 0.5 to 2 mm.

4. The method for producing rice flour according to claim 1, wherein the step of fine grinding of the primary crushed rice provides finely ground rice having a 200 mesh pass rate of 60 to 90 weight %.

5. The method for producing rice flour according to claim 1, wherein the drying step provides fine ground rice having a moisture content equal to or lower than 15 weight %.

* * * * *